(12) United States Patent
Gavriliuc et al.

(10) Patent No.: US 11,300,185 B2
(45) Date of Patent: Apr. 12, 2022

(54) ACTUATOR WITH BACKUP COMPONENT FAILURE DETECTION

(71) Applicant: Eaton Intelligent Power Limited, Dublin (IE)

(72) Inventors: Sorin Gavriliuc, Caledonia, MI (US); Joshua M. Byron, Brevard, FL (US); David R. Smit, Grand Rapids, MI (US); Paolo J. Messina, Ada, MI (US)

(73) Assignee: Eaton Intelligent Power Limited, Dublin (IE)

( * ) Notice: Subject to any disclaimer, the term of this patent is extended or adjusted under 35 U.S.C. 154(b) by 733 days.

(21) Appl. No.: 16/106,985

(22) Filed: Aug. 21, 2018

(65) Prior Publication Data
US 2019/0063567 A1    Feb. 28, 2019

Related U.S. Application Data

(60) Provisional application No. 62/548,562, filed on Aug. 22, 2017.

(51) Int. Cl.
| | |
|---|---|
| *F16H 25/20* | (2006.01) |
| *B64C 13/28* | (2006.01) |
| *F16H 25/22* | (2006.01) |
| *G01D 5/14* | (2006.01) |
| *G01B 7/16* | (2006.01) |

(52) U.S. Cl.
CPC ......... *F16H 25/205* (2013.01); *B64C 13/341* (2018.01); *F16H 25/2015* (2013.01); *F16H 25/2204* (2013.01); *G01B 7/16* (2013.01); *G01B 7/18* (2013.01); *G01D 5/142* (2013.01); *F16H 2025/2031* (2013.01)

(58) Field of Classification Search
CPC .............. F16H 25/205; F16H 25/2015; F16H 25/2204; F16H 2025/2031; F16H 2025/2081; G01D 5/142; B64C 13/341
See application file for complete search history.

(56) References Cited

U.S. PATENT DOCUMENTS

| | | | | |
|---|---|---|---|---|
| 6,672,540 B1* | 1/2004 | Shaheen | ............. | F16H 25/2204 244/99.3 |
| 8,281,678 B2* | 10/2012 | Cavalier | ................. | F16H 25/22 74/89.23 |
| 8,960,031 B2* | 2/2015 | Keech | ................... | F16H 25/205 74/89.26 |
| 9,303,743 B2* | 4/2016 | Wingett | ............. | F16H 25/2015 |
| 10,132,724 B2* | 11/2018 | Moulon | ................. | B64C 13/30 |
| 10,871,214 B2* | 12/2020 | Teyssier | ................. | F16H 57/01 |
| 10,933,978 B2* | 3/2021 | Olson | ....................... | B64C 5/10 |
| 2013/0001357 A1* | 1/2013 | Cyrot | .................... | B64C 13/505 244/99.4 |

* cited by examiner

*Primary Examiner* — Nicholas McFall
(74) *Attorney, Agent, or Firm* — Fishman Stewart PLLC (57) ABSTRACT

An actuator includes a ball screw, a rod provided at least partially within the ball screw, a ball nut, a ball nut restraint, a first biasing member disposed at least partially between a proximate end of the rod and a proximate end of the ball screw, and a second biasing member disposed at least partially between a distal end of the ball nut and an inner surface of the ball nut restraint.

23 Claims, 8 Drawing Sheets

ACTUATOR WITH BACKUP COMPONENT FAILURE DETECTION

CROSS-REFERENCE TO RELATED APPLICATION

This application claims the benefit of U.S. Provisional Patent Application Ser. No. 62/548,562, filed on Aug. 22, 2017, the disclosure of which is hereby incorporated herein by reference in its entirety.

TECHNICAL FIELD

The present disclosure generally relates to actuators, including linear actuators used in connection with aircraft.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some actuators do not provide any indication that backup components have failed, and/or it may be difficult to determine if backup components have failed.

An example of a linear actuator is described in U.S. Pat. No. 8,281,678, which is owned by the assignee hereof and is hereby incorporated by reference in its entirety as though fully set forth herein.

There is a desire for solutions/options that minimize or eliminate one or more challenges or shortcomings of actuators. The foregoing discussion is intended only to illustrate examples of the present field and should not be taken as a disavowal of scope.

SUMMARY

With embodiments, an actuator may include a ball screw; a rod provided at least partially within the ball screw; a ball nut; a ball nut restraint; a first biasing member disposed at least partially between a proximate end of the rod and a proximate end of the ball screw; and/or a second biasing member disposed at least partially between a distal end of the ball nut and an inner surface of the ball nut restraint.

In embodiments, an actuator may include a ball screw including a proximate end and a distal end; a rod provided at least partially within the ball screw, the rod including a proximate end and a distal end; a ball nut connected to the ball screw; a ball nut restraint; a torque tube that may be connected to the ball nut; and/or a torque tube restraint that may be connected to the torque tube. A primary load path may include the ball screw, the ball nut, and the torque tube. A secondary load path may include the rod, the ball nut restraint, and/or the torque tube restraint.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

In embodiments, such as generally illustrated in FIGS. 1, 2, 3, 4, and 5, an actuator 10 may include a housing 20, a torque tube 22, a torque tube restraint 24, a ball screw 26, a rod 28 (e.g., a tie-rod), a ball nut 30, a ball nut restraint 32, a cover 34, a first attachment portion 40 (e.g., a movable end), a first attachment restraint 42, a second attachment portion 44 (e.g., a fixed end), and/or a second attachment restraint 46. The cover 34 may include a first portion 34A and/or a second portion 34B. The first portion 34A may be configured to slide relative to the second portion 34B (e.g., in a telescoping movement). The first portion 34A may move with the ball screw 26. The second portion 34B may be fixed to the housing 20. Rotation of the torque tube 22, such as via a motor 50 that may be connected to the housing 20, may cause rotation of the ball nut 30, which may cause rotation and/or translation of the ball screw 26 (e.g., actuation of the actuator 10). The ball nut 30 may include balls 60 and/or ball deflectors 62. Translation of the ball screw 26, such as into and/or out of the second portion 34B of the cover 34, may cause translation of the first attachment portion 40 and/or the first attachment restraint 42, which may be connected to a distal end 30A of the ball screw 26. A mechanical component 70 to be actuated by an actuator 10 may be connected (e.g., rotatably) to the distal end 30A of the ball screw 26, such as via the first attachment portion 40 and/or the first attachment restraint 42. For example and without limitation, a horizontal trim stabilizer of an aircraft may be connected to the first attachment portion 40 and/or the first attachment restraint 42, and may be actuated via the ball screw 26. The second attachment portion 44 and/or the second attachment restraint 46 may be connected (e.g., rotatably) to a mounting component 72, such as a body of an aircraft.

In embodiments, an actuator 10 may include a primary load path and a secondary/backup load path. For example and without limitation, a primary load path may include the housing 20, the torque tube 22, the ball screw 26, the ball nut 30, the first attachment portion 40, and/or the second attachment portion 44. A secondary/backup load path may include the torque tube restraint 24, the rod 28, the ball nut restraint 32, the first attachment restraint 42, and/or the second attachment restraint 46. The secondary load path may be configured to maintain at least some functionality of the actuator 10 if one or more components of the primary load path fail.

With embodiments, a rod 28 may be disposed at least partially inside of the ball screw 26 and/or may be disposed concentrically with the ball screw 26. The rod 28 may include a distal end 28A and a proximate end 28B. The rod 28 may, at least in a design configuration, move (e.g., translate) with the ball screw 26. The rod 28 may serve as a backup or redundancy for the ball screw 26, such as in the event that the ball screw 26 is damaged or malfunctions. The ball nut restraint 32 may be connected to the ball nut 30 to share a load with the ball nut 30. The ball nut restraint 32 may include a distal end 32A and a proximate end 32B. The rod 28 and the ball nut restraint 32 may be preloaded against the ball screw 26 and the ball nut 30, respectively. If the rod 28 and/or the ball nut restraint 32 are damaged or malfunction, the actuator 10 (e.g., the ball screw 26 and the ball nut 30) may continue to function normally and there may not be any indication that damage or a malfunction has occurred. Operating an actuator 10 without functioning backup components may not be ideal, at least in some circumstances.

Figure 6:
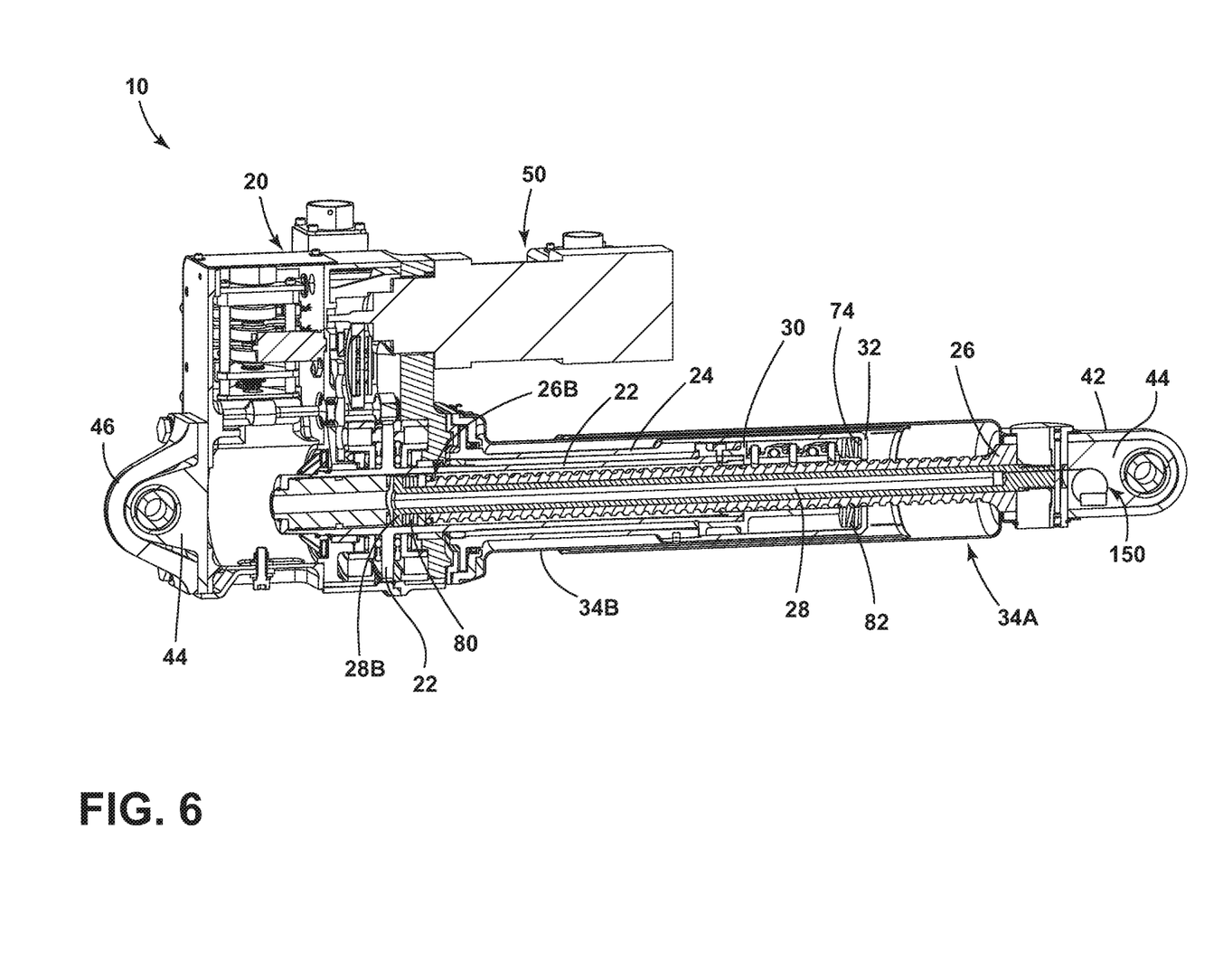
FIG. 6 is a cross-sectional perspective view generally illustrating portions of an embodiment of an actuator according to teachings of the present disclosure.
Figure 7:
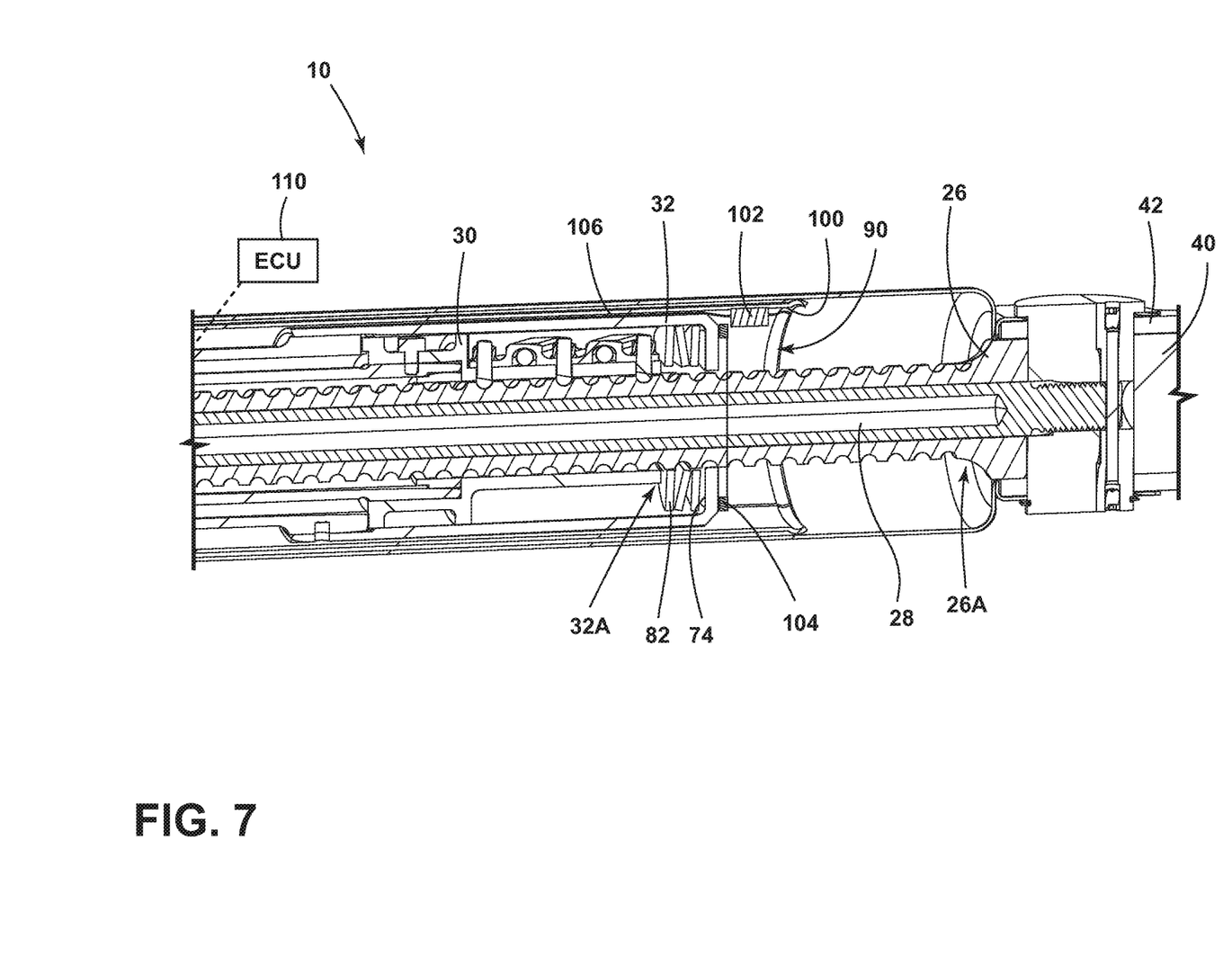
FIG. 7 is a cross-sectional perspective view generally illustrating distal portions of an embodiment of an actuator according to teachings of the present disclosure.
Figure 8:
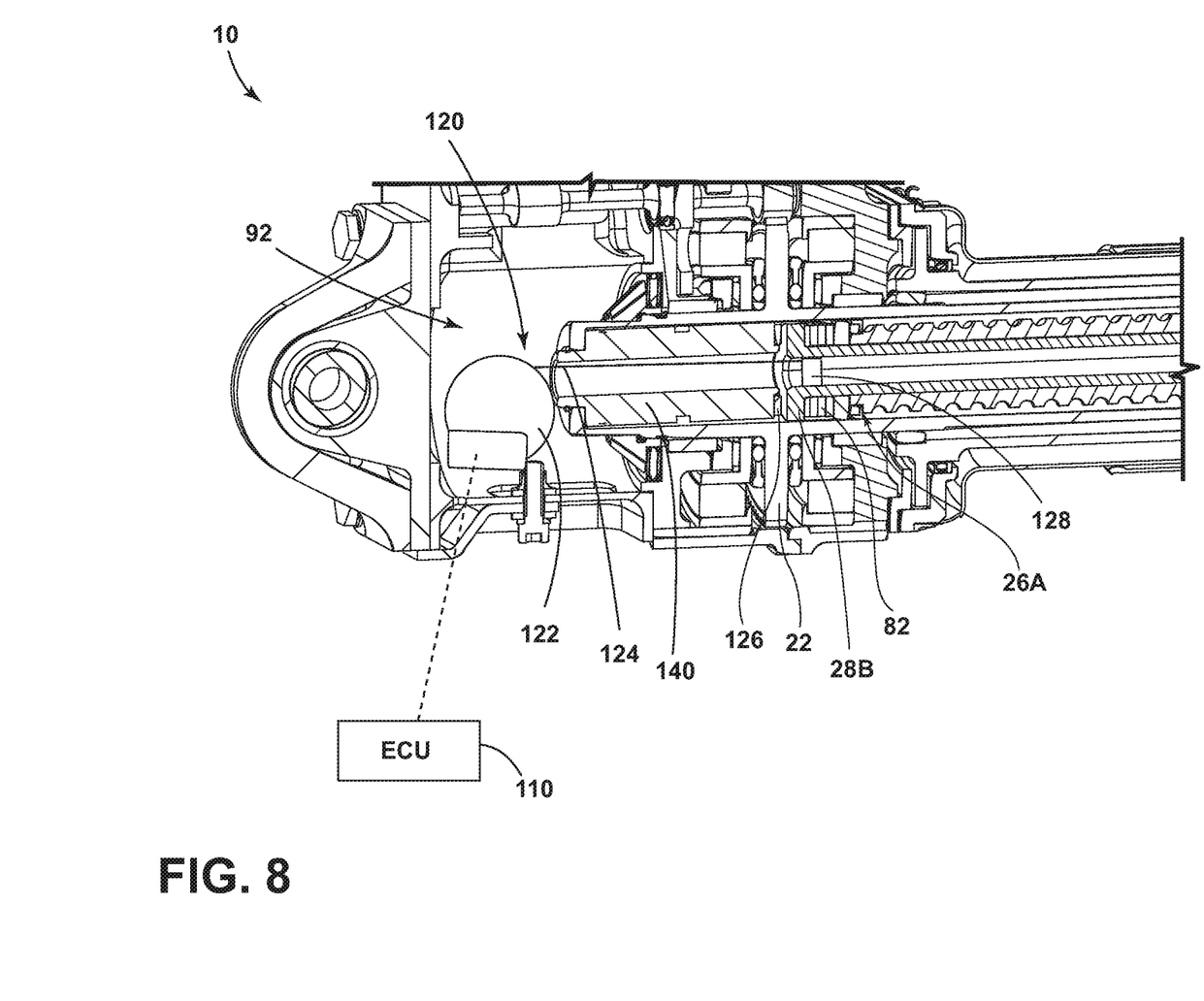
FIG. 8 is a cross-sectional perspective view generally illustrating proximate portions of an embodiment of an actuator according to teachings of the present disclosure

In embodiments, such as generally illustrated in FIGS. 6, 7 and 8, an actuator 10 may include one or more failure detectors/indicators that may be configured to facilitate detection of a failure of a component in a secondary/backup load path. A failure detector may, for example and without limitation, include a first biasing member 80 and/or a second biasing member 82.

With embodiments, such as generally illustrated in FIGS. 6 and 8, a first biasing member 80 may be disposed at least partially between the ball screw 26 and the rod 28, such as axially between proximate ends 26B, 28B of the ball screw 26 and the rod 28. The first biasing member 80 may bias the rod 28 axially away from the ball screw 26. For example and without limitation, in the event of a fracture of the rod 28, the first biasing member 80 may cause proximate ends 26B, 28B of the ball screw 26 and the rod 28 to separate from each other (e.g., axially), which may provide an indication that the rod 28 has fractured.

With embodiments, such as generally illustrated in FIGS. 6 and 7, a second biasing member 82 may be disposed at least partially between (e.g., axially) the ball nut 30 and the ball nut restraint 32, such as between a distal end 30A of the ball nut 30 and an inner axial surface 74 of the ball nut restraint 32. The ball nut 30 may include a distal end 30A and a proximate end 30B. The second biasing member 82 may bias the ball nut restraint 32 away from the ball nut 30. For example and without limitation, in the event of a fracture of the ball nut restraint 32, the second biasing member 82 may cause a distal end 32A of the ball nut restraint 32 to move axially away from the ball nut 30 (e.g., toward a distal end 26A of the ball screw 26), which may provide an indication of the fracture of the ball nut restraint 32.

In embodiments, the first biasing member 80 and/or the second biasing member 82 may, for example and without limitation, include a Belleville spring and/or a Belleville spring stack.

In embodiments, an actuator 10 may include one or more mechanical detectors/indicators that may be used in connection with the first biasing member 80 and/or the second biasing member 82. Such mechanical detectors/indicators may include, for example and without limitation, a pin, a rod, and/or a lever.

With embodiments, a failure detector may include one or more sensors that may be configured to detect damage and/or malfunction. For example and without limitation, a failure detector may include a first sensor 90 and/or a second sensor 92.

In embodiments, such as generally illustrated in FIG. 7, a first sensor 90 may be configured to monitor a position of the ball nut restraint 32 and/or to detect separating, failed ball nut restraint pieces. The first sensor 90 may be connected (e.g., fixed) to an inner surface 100 of the cover 34 and may be configured to sense or detect a proximity (or a change thereof) of the ball nut restraint 32 relative to the first sensor 90. For example and without limitation, the first sensor 90 may include a magnetic field sensor 102 (e.g., a Hall Effect sensor) and/or may include a magnetic portion 104. A magnetic portion may be connected to a distal end 32A of the ball nut restraint 32, and/or the ball nut restraint 32 may include a magnetic portion 104. As the magnetic portion 104 moves relative to the first sensor 90, such as in the event of a fracture of the ball nut restraint 32, the first sensor 90 may detect a change in a magnetic field and provide an electrical signal corresponding to such a change. The electrical signal may be transmitted via a signal wire 106 and/or wirelessly, such as to an electronic control unit (ECU) 110. A signal wire 106 may be disposed at least partially between (e.g., radially) the ball nut restraint 32 and the cover 34.

With embodiments, such as generally illustrated in FIG. 8, a second sensor 92 may be configured to sense or detect a relaxation of a preload of the rod 28. The second sensor 92 may, for example, include a strain gauge 120. A strain gauge 120 may include a signal wire spool 122 that may be disposed rearward of the proximate end 28B of the rod 28 and may be spring-loaded. The signal wire spool 122 may include a signal wire 124 that may be connected at or about a proximate end 26B of the ball screw 26 and/or a proximate end 22B of the torque tube 22. For example and without limitation, a signal wire 124 may be connected to a first strain gauge component 126 that may be connected (e.g., fixed) to the rod 28. If the rod 28 translates (e.g., with the ball screw 26), the signal wire 124 may wind around and/or unwind from the signal wire spool 122 to match such translation of the rod 28 and/or to remain under tension. Additionally or alternatively, a signal wire 124 may be connected to a second strain gauge component 128 that may be connected (e.g., fixed) to an inner portion 140 of the torque tube 22, such as an inner tube or shaft of the torque tube 22. In the event that a fracture of the rod 28 occurs, the first strain gauge component 126 and/or the second strain gauge component 128 may detect a change in strain and may provide an electrical signal corresponding to such a change. The electrical signal may be transmitted via the signal wire 124, which may be connected to an ECU 110, and/or the electrical signal may be transmitted wirelessly to the ECU 110. An ECU 110 may be configured to provide an indication (e.g., alert, message, sound, etc.) of a failure to a user/operator and/or to a remote location, such as to a monitoring service.

Figure 1:
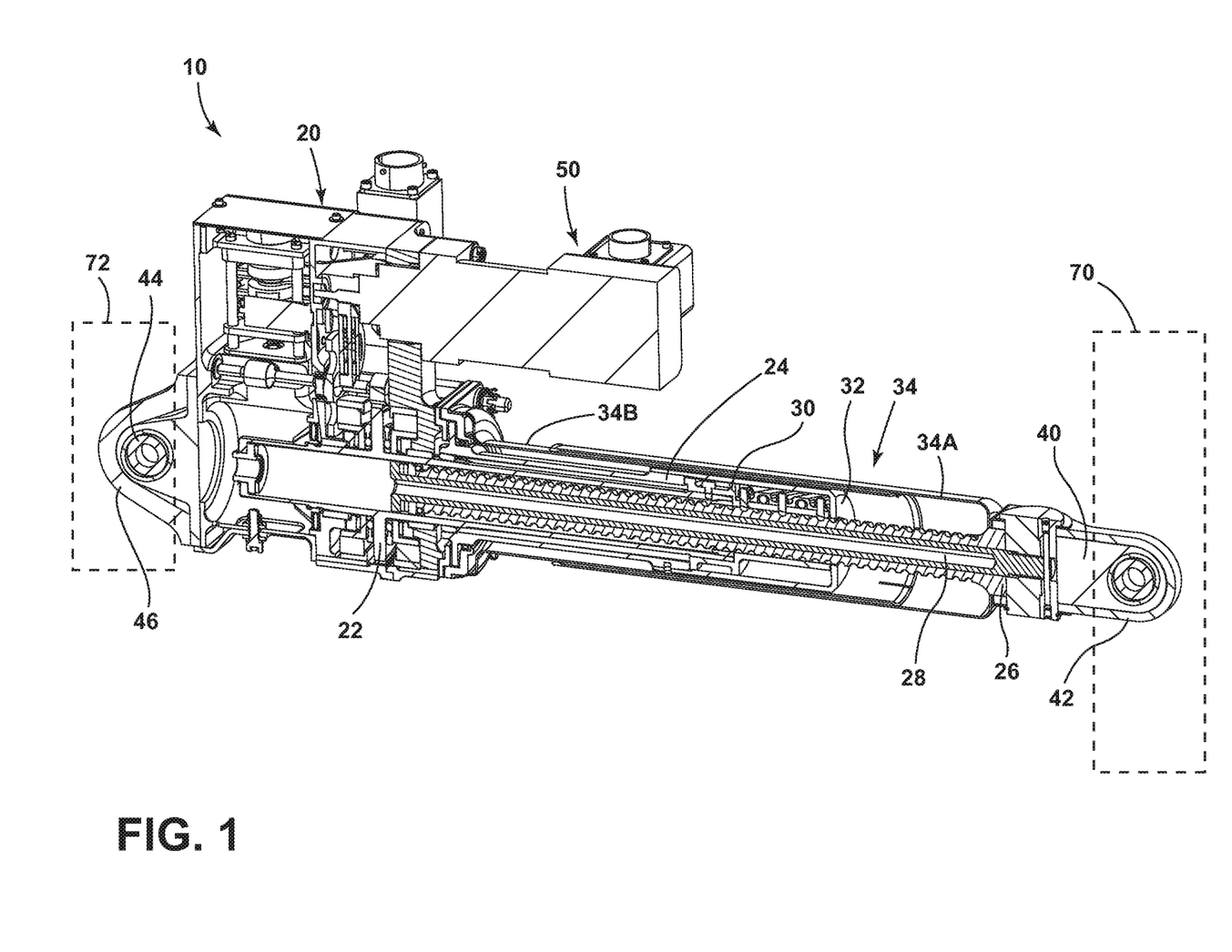
FIG. 1 is a cross-sectional perspective view generally illustrating portions of an embodiment of an actuator according to teachings of the present disclosure.
Figure 2:
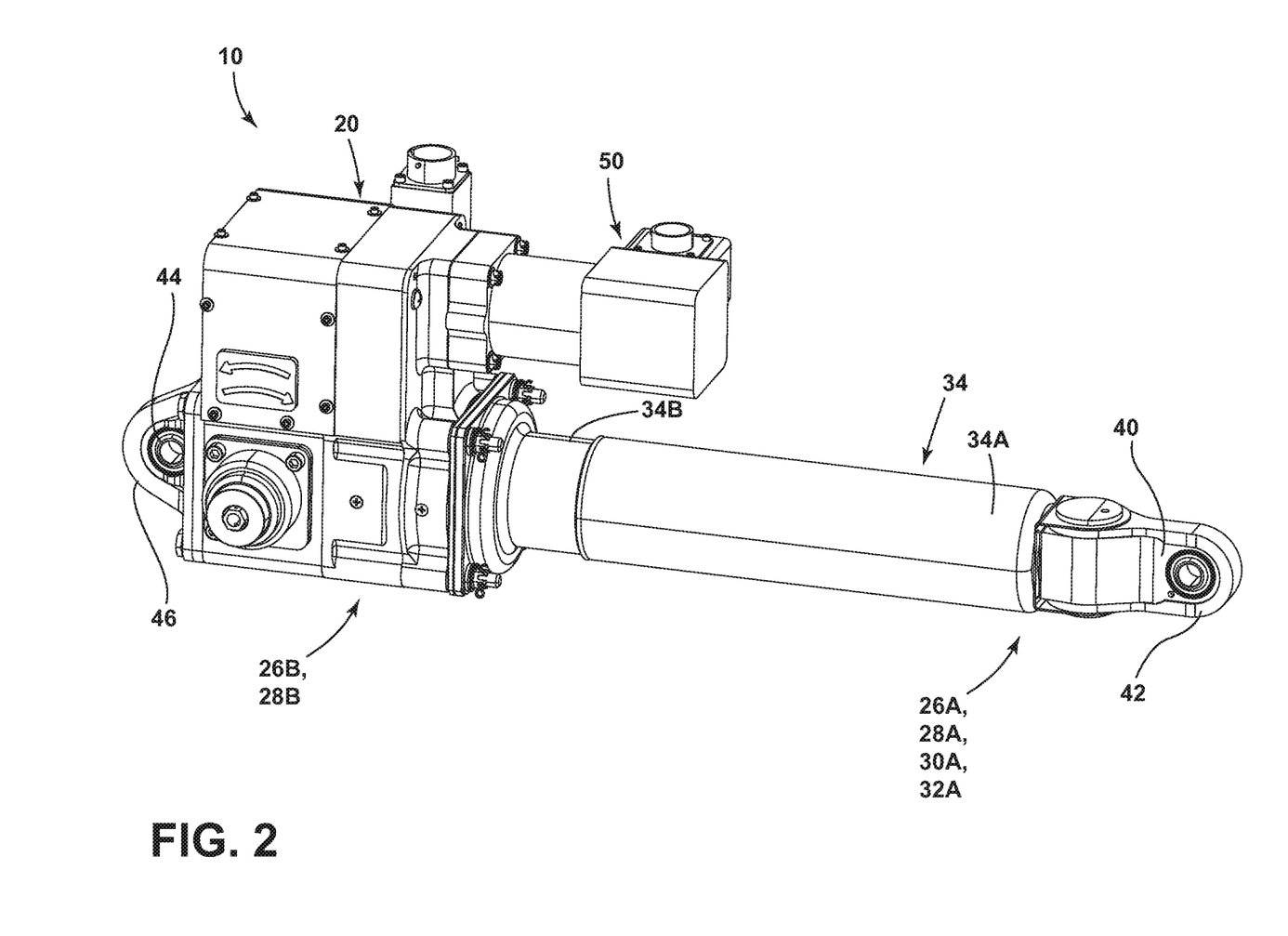
FIG. 2 is a perspective view generally illustrating an embodiment of an actuator according to teachings of the present disclosure.
Figure 3:
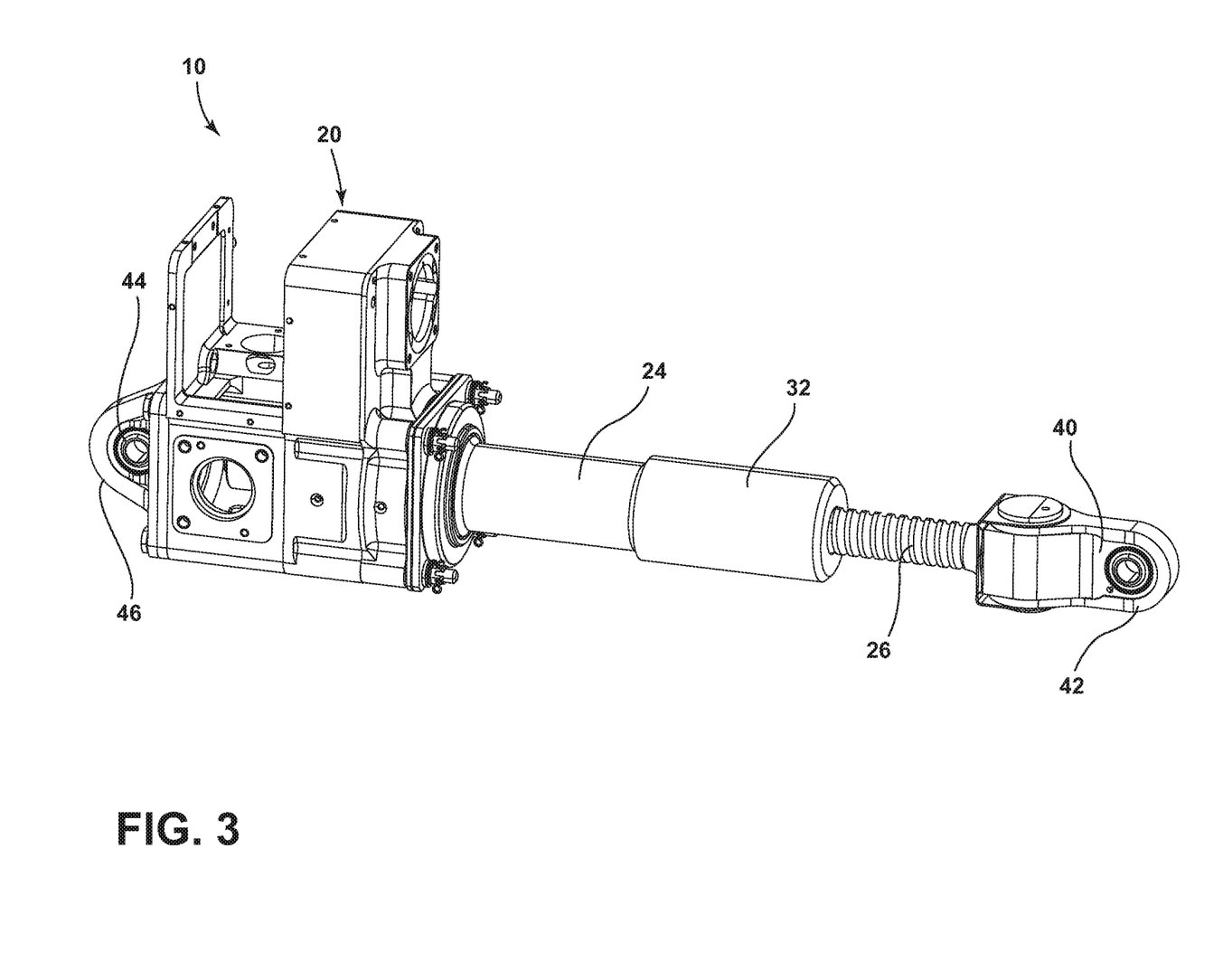
FIG. 3 is a perspective view generally illustrating portions of an embodiment of an actuator according to teachings of the present disclosure.
Figure 4:
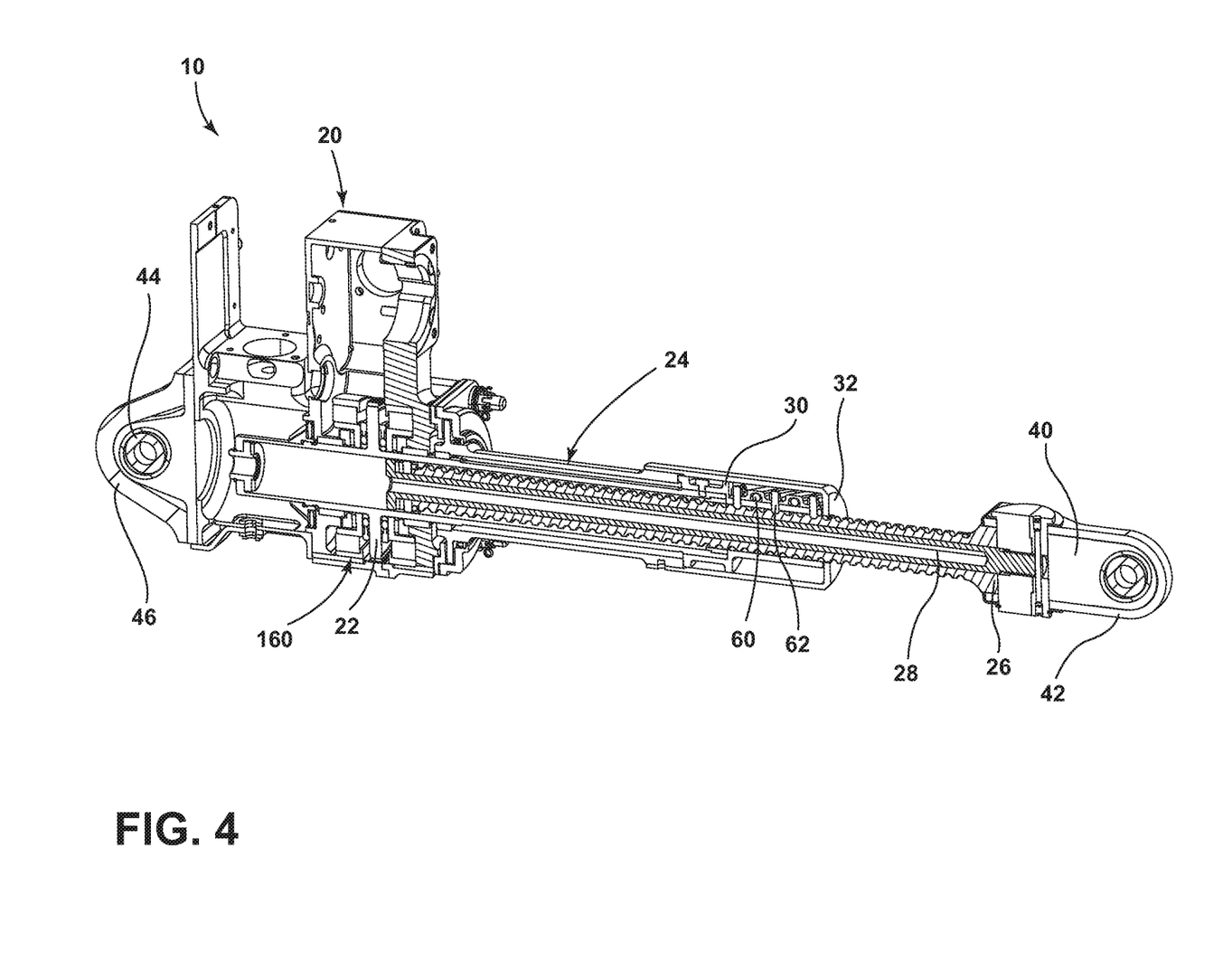
FIG. 4 is a cross-sectional perspective view generally illustrating portions of an embodiment of an actuator according to teachings of the present disclosure.
Figure 5:
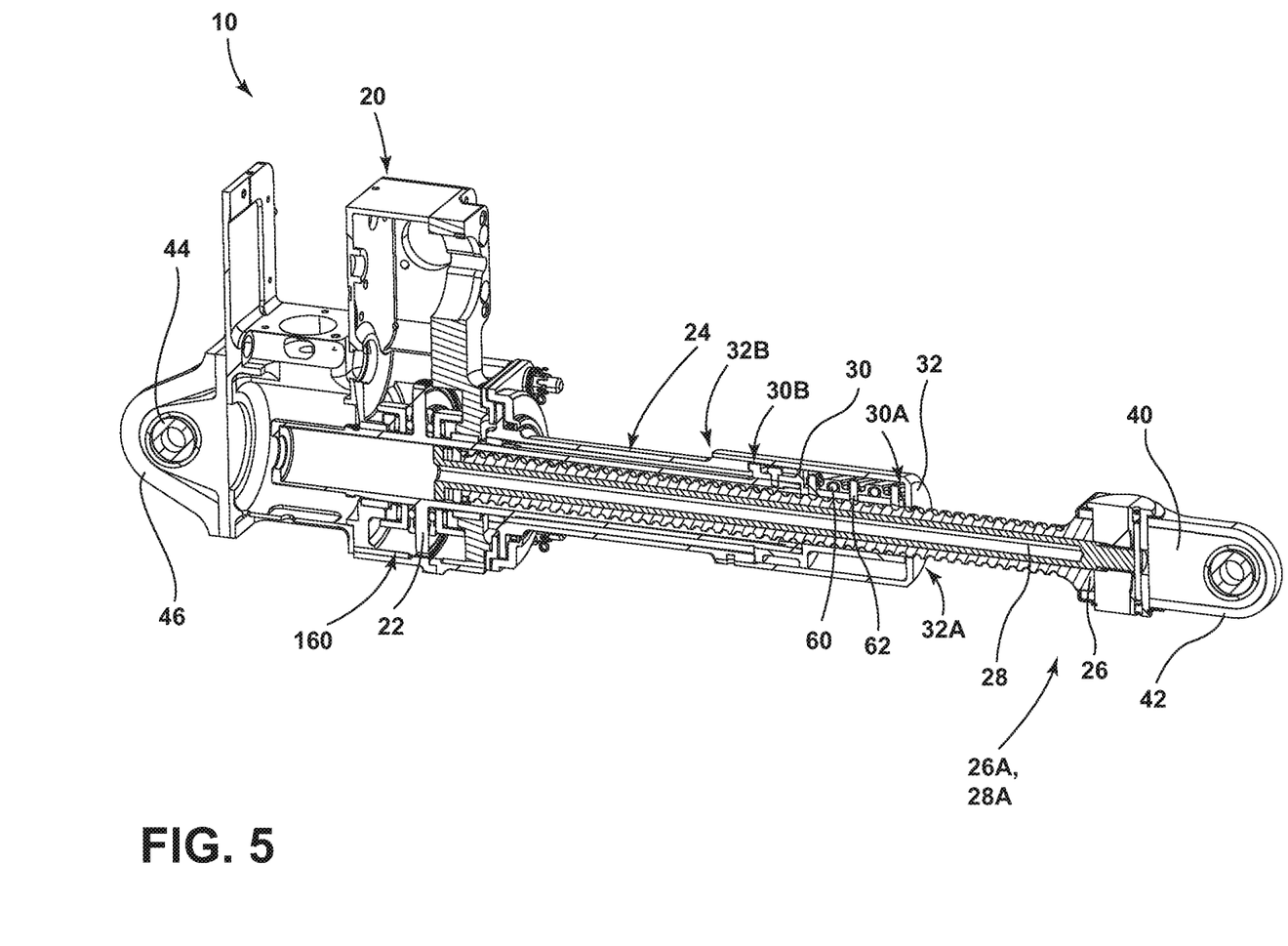
FIG. 5 is a cross-sectional perspective view generally illustrating portions of an embodiment of an actuator according to teachings of the present disclosure.

In embodiments, such as generally illustrated in FIGS. 4 and 5, an actuator may include a back-drive limiter 160.

With embodiments, such as generally illustrated in FIG. 6, an actuator 10 may include a third sensor 150, such as a second strain gauge that may be connected to the ball screw 26 and/or the ball nut restraint 32. The third sensor 150 may include a similar configuration as the second sensor 92.

In embodiments, an ECU 110 may include an electronic controller and/or include an electronic processor, such as a programmable microprocessor and/or microcontroller. In embodiments, an ECU 110 may include, for example, an application specific integrated circuit (ASIC). An ECU 110 may include a central processing unit (CPU), a memory (e.g., a non-transitory computer-readable storage medium), and/or an input/output (I/O) interface. An ECU 110 may be configured to perform various functions, including those described in greater detail herein, with appropriate programming instructions and/or code embodied in software, hardware, and/or other medium. In embodiments, an ECU 110 may include a plurality of controllers. In embodiments, an ECU 110 may be connected to a display, such as a touchscreen display.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. An actuator, comprising:
   a ball screw;
   a rod provided at least partially within the ball screw;
   a ball nut;
   a ball nut restraint;
   a first biasing member disposed at least partially between a proximate end of the rod and a proximate end of the ball screw;
   a second biasing member disposed at least partially between a distal end of the ball nut and an inner surface of the ball nut restraint; and
   a strain gauge at least partially disposed inside a torque tube, the strain gauge measures or detects change in strain of the rod.

2. The actuator of claim 1, including:
   a cover disposed at least partially over the ball nut restraint and the ball screw; and
   a sensor connected to the cover and configured to sense a proximity of the ball nut restraint relative to the cover.

3. The actuator of claim 1, wherein the strain gauge is connected at or about the proximate end of the rod.

4. The actuator of claim 3, wherein the strain gauge includes a wire spool disposed rearward of the proximate end of the rod.

5. The actuator of claim 1, including:
   a first attachment portion disposed at the proximate end of the rod;
   a first attachment restraint connected to the first attachment portion;
   a second attachment portion disposed at a distal end of the rod; and
   a second attachment restraint connected to the second attachment portion.

6. The actuator of claim 5, wherein a primary load path includes the ball screw, the ball nut, a torque tube, the first attachment portion, and the second attachment portion; and a secondary load path includes the rod, the ball nut restraint, a torque tube restraint, the first attachment restraint, and the second attachment restraint.

7. The actuator of claim 5, wherein the first attachment portion is configured for connection with a trim stabilizer of an aircraft.

8. The actuator of claim 1, including:
a cover disposed at least partially around the ball nut restraint; and
a sensor connected to an inner surface of the cover and configured to sense a position of the ball nut restraint relative to the cover.

9. The actuator of claim 8, including a first strain gauge connected to the proximate end of the rod; and a second strain gauge connected to a distal end of the rod.

10. An actuator, comprising:
a ball screw including a proximate end and a distal end;
a rod provided at least partially within the ball screw, the rod including a proximate end and a distal end;
a ball nut connected to the ball screw;
a ball nut restraint;
a torque tube connected to the ball nut;
a torque tube restraint connected to the torque tube; and
a strain gauge at least partially disposed inside a torque tube, the strain gauge detects change in strain of the rod;
wherein a primary load path includes the ball screw, the ball nut, and the torque tube; and
a secondary load path includes the rod, the ball nut restraint, and/or the torque tube restraint.

11. The actuator of claim 10, including a failure detector connected to the rod, wherein the failure detector is configured to detect a failure in the secondary load path or a failure in both the primary load path and the secondary load path.

12. The actuator of claim 11, wherein the failure detector includes a first biasing member disposed at least partially between proximate ends of the ball screw and the rod.

13. The actuator of claim 12, wherein the failure detector includes a second biasing member disposed at least partially between a distal end of the ball nut and an inner axial surface of the ball nut restraint.

14. The actuator of claim 10, including:
a cover disposed at least partially around the ball nut restraint; and
a sensor connected to an inner surface of the cover and configured to sense a position of the ball nut restraint relative to the cover.

15. The actuator of claim 10, wherein the strain gauge is configured to detect a problem with the rod according to a change in strain.

16. The actuator of claim 15, wherein the strain gauge includes a first strain gauge component and a second strain gauge component; wherein the first strain gauge component is connected to the rod; and the second strain gauge component is connected to the torque tube.

17. The actuator of claim 16, wherein the strain gauge includes a spring-loaded signal wire spool; the spring-loaded signal wire spool is disposed at a proximate end of the torque tube; and a signal wire of the spring-loaded signal wire spool is connected to the first strain gauge component.

18. The actuator of claim 10, including a motor configured to cause rotation of the ball screw via the torque tube and the ball nut.

19. The actuator of claim 10, wherein the torque tube, the rod, and the ball screw are disposed concentrically.

20. An actuator, comprising:
a hollow torque tube;
a hollow ball screw;
a rod provided at least partially within the ball screw; the torque tube, the rod, and the ball screw are disposed concentrically; and
a strain gauge, the strain gauge including a signal wire that extends through at least a portion of the torque tube and is connected to the ball screw;
wherein the strain gauge is configured to detect change in strain of the rod.

21. The actuator of claim 20, wherein the signal wire transmits a signal to an ECU.

22. The actuator of claim 21, wherein the signal wire transmits a signal wirelessly to an ECU.

23. The actuator of claim 20, wherein the strain gauge includes a signal wire spool, and the signal wire may wind around and/or unwind from the signal wire spool in response to, or to match, translation of the rod such that the signal wire remains under tension.

* * * * *